United States Patent [19]

Kara

[11] Patent Number: 4,458,281
[45] Date of Patent: Jul. 3, 1984

[54] MAGNETIC TAPE HEAD CLEANING APPARATUS

[76] Inventor: Stephen Kara, 2609 Sapra St., Thousand Oaks, Calif. 91360

[21] Appl. No.: 311,994

[22] Filed: Oct. 16, 1981

[51] Int. Cl.³ .............................................. G11B 5/41
[52] U.S. Cl. .................................. 360/128; 360/137; 15/210 R
[58] Field of Search .............. 360/128, 137; 15/210 R

[56] References Cited

U.S. PATENT DOCUMENTS

| | | | |
|---|---|---|---|
| 3,955,214 | 5/1976 | Post et al. | 360/128 |
| 4,141,053 | 2/1979 | Kara | 360/137 X |
| 4,149,206 | 4/1979 | Loiselle | 360/137 X |
| 4,272,796 | 6/1981 | Van Kreuningen | 360/128 |

Primary Examiner—John H. Wolff
Attorney, Agent, or Firm—Koppel & Harris

[57] ABSTRACT

A housing of substantially the same shape and size of a magnetic tape cassette is adapted to be inserted within the cassette receiving aperture of the magnetic tape playback/recording unit. Three resiliently biased arms are independently and rotatably coupled about pivotal points within the cassette housing. The disposition of the tape head and the capstan roller of the playback-/recording unit causes the capstan drive to initiate rotation of a coupled gear train linking the independently rotatable arms. The surface used to clean the magnetic tape head is coupled to the capstan driven gear, the resilient forces biasing the independent arms maintaining pressure against the magnetic tape head while the housing holding the cleaning apparatus is maintained within the playback/recording unit.

10 Claims, 7 Drawing Figures

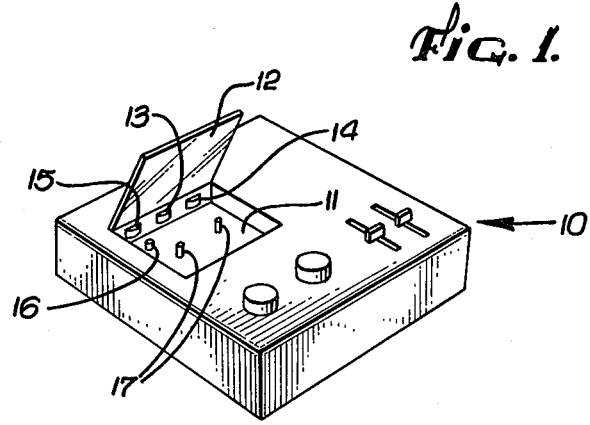
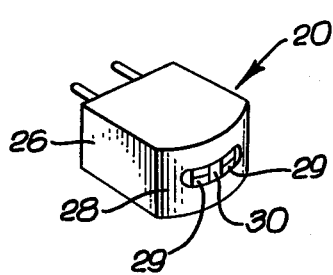
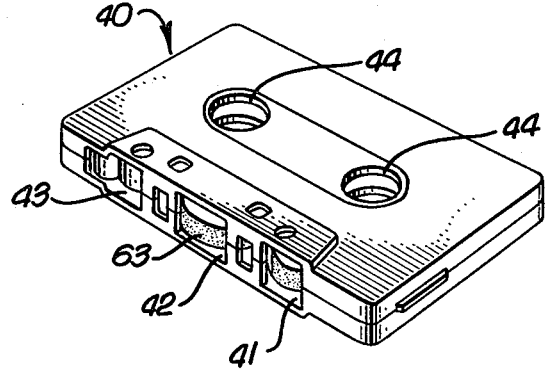
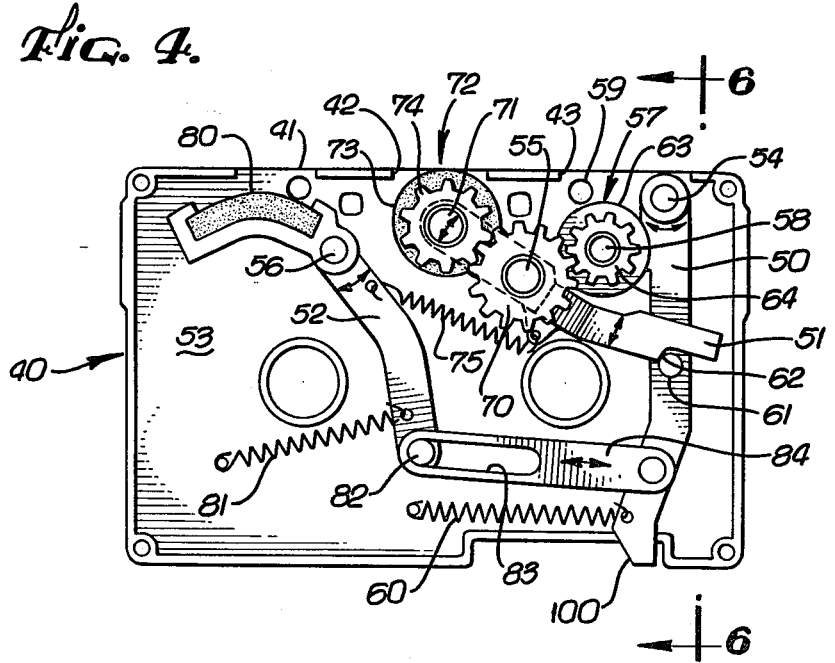

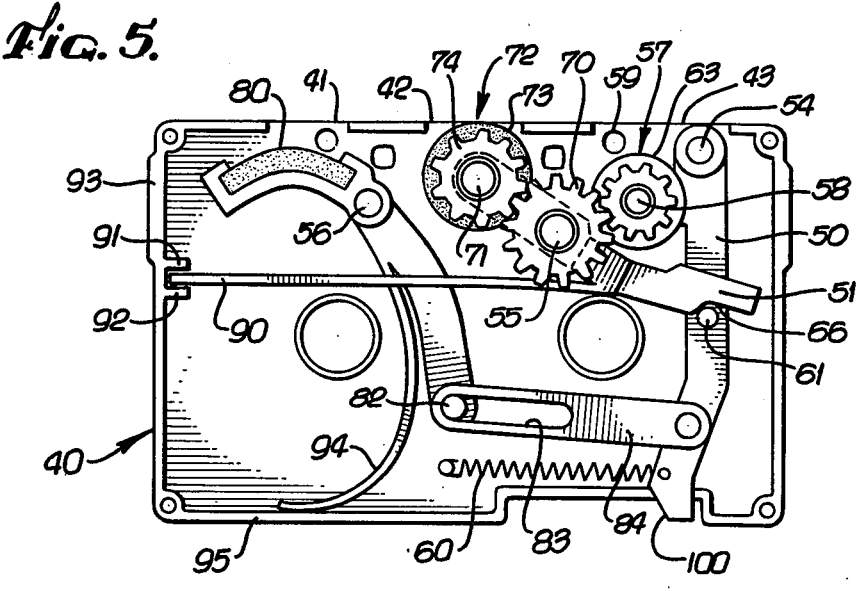
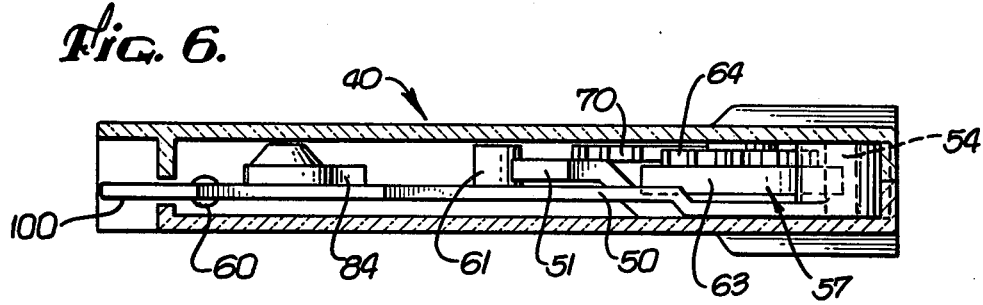
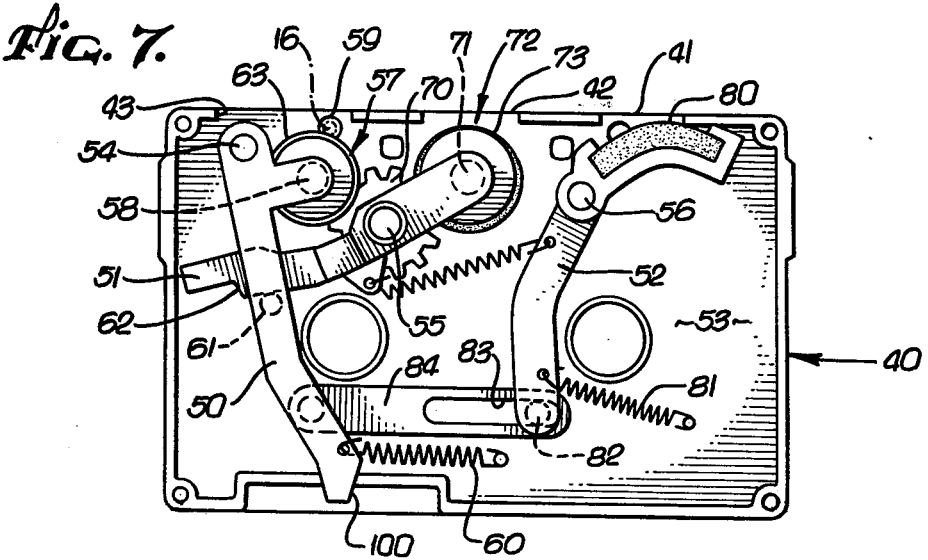

MAGNETIC TAPE HEAD CLEANING APPARATUS

BACKGROUND OF THE INVENTION

1. Field of the Invention

The present invention magnetic tape head cleaning apparatus generally relates to the field of cleaning equipment, and more particularly to cleaning equipment adapted to be used for cleaning magnetic tape heads.

2. Description of the Prior Art

The increased use of magnetic tape as a source for entertainment and other purposes has resulted in a need for more efficient ways to maintain the equipment. The cassette tape playback/recording units being used within automobiles and other applications have several characteristics in common. The units which utilize cassette mounted tapes use a standardized cassette package. In addition, the cassette is inserted within an aperture or within a fully covered receiving area in the playback-/recording unit, which unit is designed to prevent direct access to the magnetic tape head or the capstan and pinch roller which provides the motive force to the tape.

It has long been recognized that continued use of a playback/recording unit will result in the accumulation of dirt or other debris at the magnetic tape head, erase head, capstan and pinch roller. The accumulation of dirt or other debris results in degraded reproduction from or recording of the magnetic tape because of interference at the head gap. If left alone, this can result in a failure of the playback/recording unit.

The difficulty in gaining access to the magnetic tape head has lead to the development of devices which are disclosed by the prior art, none of which satisfactorily solve all of the inherent problems. One of the devices disclosed by the prior art uses a tape cartridge having an abrasive material mounted in place of the tape. The cleaning action of the magnetic tape heads is mechanical in nature and is intended to abrasively rub all dirt or debris from the fact of the magnetic tape head. The problem with this type of device is apparent. The magnetic tape head is a sensitive component made of small subcomponents, and contacting the surface of the magnetic tape head with an abrasive tape can eventually result in damage and possible destruction of the magnetic tape head.

Another device disclosed by the prior art incorporates a mounted felt strip within a magnetic tape cassette. The felt strip is urged through the cassette in the same manner as magnetic tape. The device is intended to clean the magnetic tape head by impregnating the felt strip with isopropyl alcohol or other like cleaning fluid and allows the movement of the felt strip across the magnetic tape head to clean dirt and other debris from the magnetic tape head. Several problems remain unsolved through the use of this device. Since the felt is mounted within the tape cassette to move therethrough in a manner analogous to tape, there is a substantial volume of felt material. This results in the cleaning fluid being defused substantially throughout the felt. The result is a very weak concentration of the cleaning fluid at the point of contact with the magnetic head, thus thereby minimizing the cleaning effect of the device. Another problem resides in an inability to apply sufficient pressure on the tape head to carry out the cleaning function. Since the felt strip is mounted in a manner analogous to the magnetic tape, significant pressure cannot be asserted against the strip to force it against the magnetic head. Such pressure would in effect stop the rotation of the capstan or otherwise halt the movement of the strip through the cassette and thereby prevent any cleaning action.

Another prior art device is disclosed in U.S. Pat. No. 3,761,994 (1973), which discloses a spring biased cleaning apparatus for magnetic tape cartridges. The inability to utilize a structure such as this is evident. An arm is disposed from the front to the rear wall of the cartridge a manual handle moves of the cleaning pads laterally across the magnetic tape head. The inadequacies of this device as applied to magnetic tape cassettes is evident. Since the cassette playback/recording units include an internal, covered compartment into which the magnetic tape cassette is inserted during operation, the movement of the cleaning member must be self-contained as there is no access to the internal members of the cassette.

Another device disclosed by the prior art is Applicant's U.S. Pat. No. 4,141,053 (1979). This device discloses a pair of spring biased arms which are rotatable about the hubs of the conventional housing. The present invention improves upon the device taught therein by utilizing a direct drive between the gear receiving the capstan surface and the cleaning head.

The present invention substantially solves those problems left unresolved by the devices disclosed in the prior art. Although the industry has attempted to maintain strict standards with respect to magnetic tape playback/recording units, it is well known that there is a variation of commercially available units, e.g., whether they are provided with or without tape guides. The positioning of tape guides can render many of the devices disclosed by the prior art useless for the intended purposes. In addition, any variation in the placement of the magnetic tape head capstan roller and device can also lead to inoperability of a cleaning device. The need for cleaning the magnetic tape head arises out of the structure of the magnetic tape head itself. The magnetic tape head assembly involved typically comprises separate heads for the particular number of recorded tracks of the tape being used. Each magnetic head is typically constructed of two identical core halves built of thin laminations of magnetic alloy material. Each half is then wound precisely with an identical number of turns and assembled with non-magnetic separators at the front and rear with a miniscule gap remaining at the bottom of the head which contacts the magnetic tape. As the tape transport draws the tape across the head, the gap between the core halves is shunted, and the magnetic flux path is completed. The head gap is critical in both the recording and reproduction phase of the process. When recorded tape is drawn across the gap of the head, the portion of the tape in actual contact with the gap bridges the magnetic core of the head causing magnetic flux to flow through the core. The head gap size depends on the intended function of the head. For a record head, it must be wide enough to permit the flux to penetrate the tape deeply, yet narrow enough to obtain sharp gradients of flux. For a reproduction head, gap size must be a compromise between the upper-frequency limit, dynamic range and head life. Extremely close mechanical tolerances are inherent in the head gap as well as the flux position of the tape and magnetic head. If dirt or other debris lodges on the surface of the magnetic tape head or within the head gap, the strength of the magnetic flux will be deleteriously affected.

Therefore, in order to maintain proper operating conditions, the magnetic tape head must be cleaned to remove any dirt or debris which accumulates. These conditions will occur from the scraping effect which exists as the top oxide layer passes over the tape head. The oxide build-up and dirt and debris physically disposed on the magnetic tape are all contributing factors to reduced tape head operation.

Tape transports utilizing cassette mounted magnetic tape present a different problem with regard to cleaning the magnetic tape head assembly. Magnetic tape cassettes are generally mounted with apertures which substantially preclude access to the magnetic tape heads or are mounted within compartments which preclude any access to any of the lateral edges of the cassette. Since the magnetic tape head is virtually inaccessible, the need for the present invention has arisen.

The present invention utilizes three independently rotatable arms which are resiliently biased in a manner which will permit cleaning of both the tape head and the capstan drive. The arms are resiliently biased about three independent points within the cassette housing independent of the cassette housing. The capstan drive is urged against a geared surface having a surface which will rotate about its axis at the speed of the capstan drive. A planar gear transfers the rotation thereof to the capstan cleaning head, the resilient forces imposed on the gear train and the arms holding same maintaining appropriate forces against the tape head. The magnetic tape head will be subjected to sufficient cleaning motion irrespective of minor variations in the placement of the capstan roller and drive and the presence or absence of the guides.

The present invention comprises an apparatus for providing means to clean the magnetic tape head assembly of a playback/recording unit adapted for mounting tape cassettes. It is to be noted that the present invention can be adapted for cleaning the magnetic tape heads of eight-track cartridge transports, but for the purpose of example, cassette equipment shall be discussed.

SUMMARY OF THE INVENTION

A housing having substantially the same shape as a magnetic tape cassette provides for mounting the cleaning apparatus. A cassette housing is utilized to provide the supporting structure for the present invention magnetic tape head cleaning apparatus. A rotatable surface adapted for contacting the capstan roller is rotatably coupled to a first arm which is pivotable about an axis positioned along the front of the housing. The opposite end of the first arm is resiliently coupled to a point within the housing permitting lateral movement of the first arm between points which are limited by an opening in the housing and the second arm. A planar transfer gear is coupled to the capstan driven gear, the planar transfer gear being rotatably coupled to the second arm. The rotatable motion of the capstan drive is driven through the capstan driven gear, planar transfer gear to the tape head cleaning surface. The second arm is again resiliently coupled in a manner which will cause said second arm to maintain a sufficient force against the tape head cleaning surface in order to satisfy the objectives of the present invention.

When the present invention magnetic tape head cleaning apparatus is inserted within the recording/playback unit, the position of the capstan roller causes rotation of the capstan driven member transferring said rotation to the cleaning surface. When operating, the present invention magnetic tape head cleaning apparatus can appropriately adapt to variations in the placement of capstan drive and roller and will maintain appropriate pressure against the magnetic tape head to insure a proper cleaning motion irrespective of whether the recording/playback unit utilizes a tape guide. The spring biasing of the internal members will insure appropriate cleaning of the magnetic tape head under substantially all conditions.

It is therefore an object of the present invention to provide an improved magnetic tape head cleaning apparatus.

It is another object of the present invention to provide a non-abrasive magnetic tape head cleaning apparatus.

It is still another object of the present invention to provide an improved magnetic tape head cleaning apparatus mounted within a tape cassette.

It is still yet another object of the present invention to provide a magnetic tape head cleaning apparatus incorporating means for cleaning the capstan of the magnetic tape transport.

The novel features which are believed to be characteristic of the invention, both as to its organization and method of operation, together with further objectives and advantages thereof, will be better understood from the following description considered in connection with the accompanying drawing in which a presently preferred embodiment of the invention is illustrated by way of example. It is to be expressly understood, however, that the drawing is for the purpose of illustration and description only and is not intended as a definition of the limits of the invention.

BRIEF DESCRIPTION OF THE DRAWINGS

FIG. 1 is a front perspective view of one form of a magnetic tape transport adapted for using cassette mounted magnetic tapes.

FIG. 2 is a front perspective view of an exemplary magnetic tape head to be cleaned in accordance with the present invention.

FIG. 3 is a front perspective view of the present invention cassette tape head cleaner illustrating the quiescent position of the cleaning portion of the present invention.

FIG. 4 is a top plan view of the interior of a form of the present invention magnetic tape head cleaning apparatus.

FIG. 5 is a top plan view of the interior of another form of the present invention magnetic tape head cleaning apparatus showing an alternate structure for applying resilient forces to the interior arms.

FIG. 6 is a partial cross-sectional view taken through line 6—6 of FIG. 4.

FIG. 7 is a bottom plan view of the form of the present invention shown in FIG. 4.

DETAILED DESCRIPTION OF THE PREFERRED EMBODIMENT

An understanding of the use of the present invention magnetic tape head cleaning apparatus can be best gained by reference to FIG. 1 wherein an exemplary magnetic tape cassette recoding/playback transport unit is shown, the transport unit being generally designated by the reference numeral 10. Magnetic tape transport unit 10 is typically a reproduction unit adapted to receive magnetic tape cassettes. Transport unit 10 employs an internal compartment 11 accessible by cover 12. A tape cassette is placed within compartment 11 during operation of transport unit 10. As illustrated, magnetic tape head 13, erase head 14, capstan pinch roller 15 and capstan drive 16 can be seen. When a cassette unit is disposed within compartment 11 and cover 12 moves into position, none of the lateral edges of the tape cassette will be accessible. As shown in FIG. 1, the cassette will be disposed upon hub drive 17, but the tape cassette itself will be essentially inaccessible. It is to be understood that the form of the transport unit 10 shown in FIG. 1 is for the purpose of example only. The present invention magnetic tape head cleaning apparatus will function properly in all conventional transport units which utilize cassette mounted tape.

For the purpose of example, the magnetic tape transport unit 10 shown in FIG. 1 will be used to explain the present invention. The preferred form of the magnetic tape head cleaning apparatus is disposed within compartment 11 of the transport unit 10 in substantially the same manner as the magnetic tape cassette which is intended for use within transport unit 10. The structure of magnetic tape head cleaning apparatus is described in FIG. 2. Magnetic head assembly 20 comprises an outer housing 26 having a convex profile 28 adequate for interface with the magnetic tape disposed within a suitable cassette. Head assembly 20 (FIG. 2) comprises a 2-track magnetic head consisting of two magnetic heads 29, each made up of a pair of core halves typically built of thin laminations of alloy materials. One pair of heads is necessary since the magnetic tape stored within a cassette is recorded by placing two recorded tracks on each half of the tape. Each core half is precisely wound with a predetermined number of turns and assembled with non-magnetic separators at the front and rear of the head with a small gap 30 separating the core halves. The spacing between magnetic heads 29 becomes important to eliminate cross-talk between tracks.

In operation, when magnetic tape is drawn across gap 30, the portion of tape in actual contact with the gap bridges the gap between the magnetic core halves causing magnetic flux to flow through the core. As transport 10 draws the tape across surface 28 of head assembly 20, gap 30 is shunted and the flux path through each of the magnetic heads 29 is completed. If dirt or other debris lodges in gap 30 or causes a shunted medium to exist between adjacent tracks, the performance of magnetic head assembly 20 and therefore transport 10 would be seriously degraded. It therefore becomes obvious that means must be provided to remove effectively any dirt or debris which may become lodged between any pair of core halves of a magnetic head 39 or between adjacent tracks.

The present invention magnetic tape head cleaning apparatus comprises an outer housing 40 (FIGS. 4-7) which is constructed similar to the magnetic tape cassettes used with transport 10 (FIG. 1). The front wall of housing 40 has three apertures 41, 42 and 43 to interface with the structural assembly of transport 10. Aperture 43 receives the capstan pinch roller 14. Aperture 42 at the center of housing 40 will be in cooperative relationship with magnetic tape head 30. Aperture 41 in the front surface of outer housing 40 will lie adjacent and be adapted to be urged against the capstan drive 16 upon reversed insertion of housing 40. Drive hubs 44 are adapted to be disposed about shaft 17 of transport 10.

FIGS. 4, 6 and 7 show a preferred form of the present invention. FIG. 7 illustrates the placement of the interior arms of the present invention after housing 40 is inserted within a transport 10, and FIG. 4 shows their position before housing 40 is inserted and before the interior arm contacts capstan drive 16. Spring biased arms 50, 51 and 52 are pivotally coupled about projections 54, 55 and 56 respectively depending upwardly from surface 53 of housing 40. Capstan driven wheel member 57 is rotatably coupled about projection 58 extending from spring biased arm 50. Mounting means in the housing supports the driven wheel member between two positions as explained in more detail below. Aperture 59 is disposed through surface 53 of housing 40 in order to receive capstan drive 16. In the exemplary embodiment, the mounting means for the driven wheel member comprises spring biased arm 50, which in FIG. 4 is rotated from a first position in which driven wheel member 57 is in contact with capstan drive 16 extending through opening 59 counterclockwise to a second position where capstan wheel 57 is out of contact with capstan drive 16. The second position (FIG. 4) provides unrestricted insertion of capstan drive 16 within aperture 59. A clockwise resilient force is applied to the end of spring biased arm 50 opposite projection 54 through the use of a helical spring 60. As will be described below, the present invention also has a head cleaning wheel 72 and wheel mounting means in the housing for mounting the wheel adjacent the head. In the exemplary embodiment, the wheel mounting means comprises arm 51 which is mounted on pivot 55 extending upward from bottom wall 53 of housing 40. Blocking means on the wheel mounting means blocks movement of the mounting means of the driven member from the second position to the first position. In the exemplary embodiment, the blocking means comprises projection 61 extending upward from arm 50 and a detent 62 on arm 51 engaging projection 61 when arm 50 is in its second position. When housing 40 is inserted within tape transport 10, tape head 13 causes spring biased arm 51 to rotate about projection 55 and release projection 61 from detent 62. As soon as projection 61 is released, the force imposed by spring 60 will permit spring biased arm 52 to rotate clockwise and urge capstan driven wheel 57 against the capstan drive 16.

Capstan driven wheel 57 comprises a resilient surface 63 and integral gear 64 which concentrically rotate about the axis of projection 58. When capstan driven wheel 57 is in contact with capstan drive 16, a rotating force imposed by gear 64 is transferred to planar transfer gear 70, which rotates about projection 55 on spring biased arm 51. Axis of transfer gear 70 is also the axis on which arm 51 pivots. Although the use of meshing gears 64 and 70 is the preferred form of the present invention, it is understood that planar gear 64 can be replaced by a belt and roller assembly transferring the rotational force to the capstan drive 16 to a receiving roller which is made integral with transfer gear 70.

Projection 71 depends upwardly from the end of spring biased arm 51 which is located adjacent aperture 42. Head cleaning wheel 72 comprise a non-abrasive surface 73 and an integral planar gear 74. Non-abrasive surface 73 comprises an unsymmetrical rotating surface about projection 71. Although non-abrasive surface 73 can be made uniform, the use of an unsymmetrical surface to be disposed against tape head 13 will provide a broader cleaning area when the non-abrasive surface 73 is imposed against tape head 13. For the purpose of defining the geometry of surface 73, it shall be deemed to be unsymmetrical to the extent that the radius between surface 73 and projection 71 is variable. As can be best seen in FIG. 4, planar gear 74 is rotated by the rotational force imposed by capstan 16 on driven wheel 57 and its integral gear 64 through the use of planar transfer gear 70. Gears 64, 70 and 74 of the exemplary embodiment are considered coupling means that extend between driven member 57 and cleaning wheel 72 for rotating the cleaning wheel when the capstan rotates the driven wheel.

In the form of the present invention shown in FIGS. 4, 6 and 7, the arm 51 is biased through the use of helical spring 75. Helical spring 75 is disposed between arms 51 and 52 causing arm 51 to rotate in a clockwise manner about projection 55. This will insure that there is a resilient force urging the non-abrasive surface 74 against tape head 13.

The present invention also provides means for cleaning the surface of the capstan drive. Spring biased arm 52 is rotatable about projection 56. Cleaning surface 80 is disposed at one end thereof, the opposite end being subjected to a resilient force imposed by helical spring 81. In order to limit the rotation of the spring biased arm 52 appropriately, projection 82 depends upwardly from arm 52 and is disposed within slot 83 of connecting arm 84. Connecting arm 84 is pivotally coupled to spring biased arm 50 and thereby limits the rotation of spring biased arm 52.

Another form of the present invention can be seen in FIG. 5 wherein an alternate structure for the resilient forces imposed by helical springs 75 and 81 are shown. For the purpose of simplicity, elements having corresponding parts in FIG. 4 are given like reference numerals. As was described hereinabove, helical springs 75 impose a clockwise force upon spring biased arm 51 in order to insure that head cleaning wheel 72 is urged against tape head 13 with sufficient force to clean any debris from tape head 13. An alternate form of the present invention replaces helical spring 75 and its connection to spring biased arm 52 with resilient extension 90. Resilient extension 90 is integral with spring biased arm 51 and is disposed between projections 91 and 92 which depend inwardly from wall 93 of housing 40. When the present invention tape head cleaning apparatus is inserted and the tape head 13 imposes an inward force against head cleaning wheel 72, extension 90 will produce an opposing force causing head cleaning wheel 72 to be resiliently urged against tape head 13. In a like manner, helical spring 81 is replaced by resilient projection 94 which is disposed against side wall 95 of housing 40.

As will be described, when the present invention tape head cleaning apparatus is inserted in transport 10 in an inverted position capstan drive 16 is positioned against cleaning head 80 tending to rotate arm 52 counterclockwise about projection 56. The resilient forces imposed by extension 94 against side wall 95 will oppose the force imposed by capstan drive 16 thereby maintaining an appropriate force against capstan drive 16 and thereby allow cleaning of same.

The use of the present invention can be best understood by reference to FIG. 4 and FIG. 7. Prior to insertion of the present invention tape head cleaning apparatus, manual force is imposed upon end 100 of spring biased arm 50, which extends out of a secondary opening in the rear of housing 40, urging end 100 to the right until projection 61 is engaged by detent 62. By rotating spring biased arm 50, aperture 59 is unobstructed thereby allowing for the insertion of capstan drive 16.

In this position, helical spring 60 is stretched imposing a resilient force which would rotate the spring biased arm 50 in a clockwise direction in the absence of engagement of projection 61 by detent 62. Upon the insertion of the tape head cleaning apparatus into tape transport 10, tape head 13 is urged against cleaning wheel 72 causing spring biased arm 51 to rotate in a counterclockwise direction, which releases projection 61. The resilient force imposed by helical spring 60 urges capstan driven wheel 57 against capstan drive 16 causing the rotation of capstan drive 16 to be transferred to wheel 57 and the engaged gears. The rotational force of capstan drive 16 is transferred through transfer gear 70 to head cleaning wheel 72. The resilient force imposed by helical spring 75 (FIG. 4) or resilient extension 90 (FIG. 5) insures that head cleaning wheel 72 is maintained in sufficient contact with tape head 13 to insure removal of any debris disposed on tape head 13.

In order to clean the surface of capstan drive 16, the present invention tape head cleaning apparatus is inserted so that cleaning surface 80 is adjacent capstan drive 16. As described hereinabove, end 100 of spring biased arm 50 is placed in the position shown in FIG. 4 (or FIG. 7). The disposition of tape head 13 against head cleaning wheel 72 will release projection 61 from detent 62 causing surface 80 to be urged against the rotating capstan drive providing for an appropriate cleaning operation.

The present invention magnetic tape head cleaning apparatus provides improved means for cleaning the magnetic tape head and capstan drive of a conventional recording/playback unit which utilizes cassette mounted magnetic tape. Irrespective of whether the transport unit utilizes a tape guide or has minor variations in the placement of the capstan roller and drive, the present invention cleaning apparatus operates effectively.

I claim:
1. An apparatus for cleaning the magnetic tape head of a magnetic tape transport having a driven capstan roller comprising:
(a) a housing having front and bottom walls, the front wall having at least a head aperture adjacent the head of the transport and a capstan opening adjacent the capstan of the transport;
(b) a driven member in the housing, driven member mounting means in the housing for supporting the driven member between two positions, the first position mounting the driven member in contact with the capstan of the transport and the second position mounting the driven member out of contact with the capstan, means for biasing the driven member mounting means toward the first position;
(c) a head cleaning wheel and wheel mounting means in the housing for mounting the wheel adjacent the head, the head mounting means being movable under influence of the head on the wheel between two positions;
(d) blocking means on the wheel mounting means for blocking the movement of the driven member mounting means from the second position to the first position in a first position of the blocking means and releasing the driven member mounting means to its first position when the blocking means is in its second position; and
(e) coupling means extending between the driven member and the head cleaning wheel for rotating the head cleaning wheel when the capstan rotates the driven member.

2. The apparatus of claim 1 wherein the driven member mounting means comprises a first arm, the driven member being mounted near one end of the first arm, and a second end of the first arm extending to a position in the housing where it can be engaged manually to move between its first and second position.

3. The apparatus of claim 1 wherein the blocking means comprises detent on the wheel mounting means, the driven member mounting means having a projection enganging the detent, the wheel mounting means pivoting about a second axis in the housing whereby the detent and the projection release each other when the head urges the head cleaning wheel to pivot the wheel mounting means about the second axis.

4. The apparatus of claim 1 further comprising a secondary opening in the housing spaced from the front wall, a portion of the first arm extending through the opening where it is accessible to move such end of the first arm to pivot the first arm.

5. The apparatus of claim 4 wherein the intermediate transfer gear is mounted for rotation on the wheel mounting means.

6. The apparatus of claim 1 wherein the coupling means comprises a first gear mounted for rotation with the driven member, a second gear mounted for rotation on the head cleaning wheel and an intermediate transfer gear engaging the first and second gears for transferring rotation from the first gear to the second gear.

7. The apparatus of claim 1 wherein the wheel mounting means includes a wheel shaft for mounting the head cleaning wheel for rotation about the wheel shaft, the head cleaning wheel being asymmetrical about the wheel shaft.

8. The apparatus of claim 1 further comprising a capstan cleaning member and capstan cleaning support means in the housing for mounting the capstan cleaning member between two positions, the front wall of the housing having an additional opening, the first position of the capstan cleaner support member being adjacent the third opening, and the second position being away from the third opening.

9. The apparatus of claim 8 further comprising linkage means extending between the capstan cleaning support member and the driven member mounting means for moving the capstan cleaner support member to its second position when the driven member mounting means is in the first position and moving the capstan cleaning support member to its first position when the driven member mounting means is in its second position.

10. The apparatus of claim 8 further comprising biasing means connected to the capstan cleaning support means for urging the capstan cleaning member toward the third opening.

* * * * *